No. 876,589. PATENTED JAN. 14, 1908.
C. S. REES & W. FISCHER, Jr.
BROOM HOLDER.
APPLICATION FILED JULY 3, 1907.
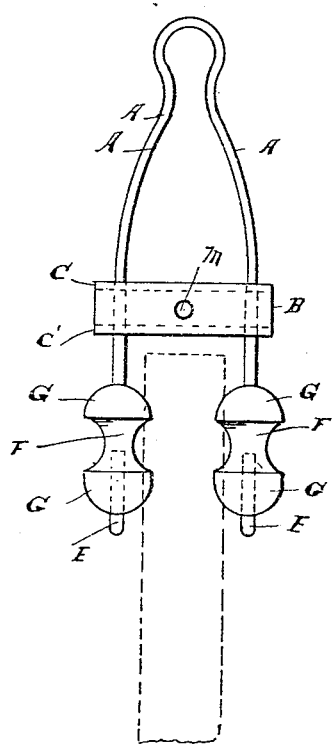
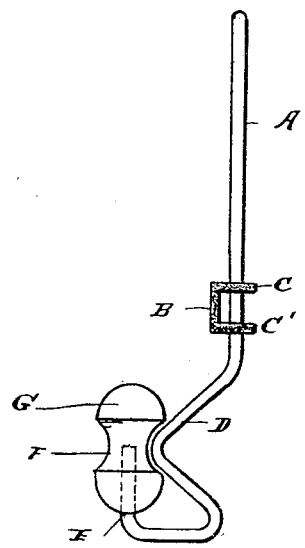
Witnesses:
James M Daniels
Abraham Luderback
Inventors.
Charles Rees
William Fischer, Jr.
Honor A. Herr, Atty.

UNITED STATES PATENT OFFICE.

CHARLES S. REES, OF PHILADELPHIA, PENNSYLVANIA, AND WILLIAM FISCHER, JR., OF PATERSON, NEW JERSEY; SAID FISCHER ASSIGNOR TO SAID REES.

BROOM-HOLDER.

No. 876,589.　　Specification of Letters Patent.　　Patented Jan. 14, 1908.

Application filed July 3, 1907. Serial No. 382,111.

*To all whom it may concern:*

Be it known that we, CHARLES S. REES and WILLIAM FISCHER, Jr., citizens of the United States, and residents, respectively, of Philadelphia, county of Philadelphia, and State of Pennsylvania, and of Paterson, county of Passaic, State of New Jersey, have invented certain new and useful Improvements in Broom-Holders, of which the following is a specification.

Our invention has reference to broom holders and consists of features fully set forth in the following specification and the accompanying drawing forming part thereof.

The object of our invention is to provide a broom holder that will, firstly, securely hold the broom; secondly, provide a variable clamp for the broom, whereby the pressure or friction on the broom will be increased or decreased at pleasure, and thirdly, a broom holder that is cheap in construction.

It consists of a wire bent approximately of an inverted U shape with a triangular dent on each arm and the said dent engaging in or with a circumferential groove of the friction roller supports, thus holding the said rollers in position. The said rollers are supported on the arms of the U shaped member in the manner to be described hereinafter.

In the drawings like parts are referred to by marks or figures of a corresponding kind in the different views.

Figure 1 is a side elevation of my device and Fig. 2 an end view thereof.

A. A. are two portions of an inverted U shaped form having resiliency from being made of spring wire. At the lower end of the wire each leg is bent triangular as shown at D. E. E. are two upward projecting terminals of the two parts A. A.

G. G. are two spools or friction rollers provided with circumferential groove F.

The apex of the triangles indicated by D, of which there are two, engages the grooves F. F. and overlaps the larger circumference of the ends G. G. of the friction roller for retaining the broom.

B. is a tension inducing or relaxing member, as it is moved towards the friction roll-
ers G. G. the tension of the spring arms A. A.
is increased and as it is moved upwards it is relaxed obviously.

H. is a broom handle.

The lines L. L. show the expansion of the medial line of the friction rollers during the insertion of the broom handle. The arrangement of the rollers G and the manner of supporting them is a very simple, cheap and effective one. As shown the stem E passes partly into the roller G and the angle D engages the rounded groove of the said friction roller.

M—. is a hole in sliding frame; C. C' are flanges through which the member A. A. passes, being retained there by friction.

Having described our invention, what we claim as new and desirable to secure by Letters Patent:—

1. In a broom holder having a metallic resilient frame member, two broom engaging friction rollers supported thereby, the rollers having circumferential grooves, a co-inciding portion of the said frame member engaging in said grooves whereby said rollers are held in place.

2. A broom holder formed from wire comprising two arms bent intermediate to their ends to form triangular portions, rollers carried by the extremities of the said arms, said rollers having circumferential grooves, the triangular portion of the arms co-acting and engaging with the grooved portions of the rollers.

3. A broom holder comprising a frame gripping rollers supported at the extremities of said frame and means for varying the gripping tension of the rollers, the frame being provided with the means for engaging the circumference of the rollers for retaining them in position upon the extremities of the frame.

In testimony whereof we affix our signatures in presence of two witnesses.

CHARLES S. REES.
　　　　　　　　　WILLIAM FISCHER, JR.

Witnesses:
　ISAAC H. GARRABRANT,
　JOHN KEYS.